(12) United States Patent
Layfield et al.

(10) Patent No.: US 8,919,863 B2
(45) Date of Patent: Dec. 30, 2014

(54) DRAG REDUCTION PLATE AND STRUCTURE FOR TRAILERS

(71) Applicant: Laydon Composites Ltd., Oakville (CA)

(72) Inventors: Brian P. Layfield, Oakville (CA); James D. Haws, Ancaster (CA); Jeffrey V. Littlefield, Mississauga (CA)

(73) Assignee: Laydon Composites Ltd., Oakville, ON (CA)

( * ) Notice: Subject to any disclaimer, the term of this patent is extended or adjusted under 35 U.S.C. 154(b) by 0 days.

(21) Appl. No.: 13/651,671

(22) Filed: Oct. 15, 2012

(65) Prior Publication Data

US 2013/0285411 A1    Oct. 31, 2013

Related U.S. Application Data

(60) Provisional application No. 61/546,944, filed on Oct. 13, 2011.

(51) Int. Cl.
*B62D 35/02* (2006.01)
*B62D 35/00* (2006.01)

(52) U.S. Cl.
CPC .............. *B62D 35/02* (2013.01); *B62D 35/001* (2013.01)
USPC ..................................................... 296/180.4

(58) Field of Classification Search
CPC .............................. B62D 35/001; B62D 35/02
USPC ............................................ 296/180.1, 180.4
See application file for complete search history.

(56) References Cited

U.S. PATENT DOCUMENTS

| | | | |
|---|---|---|---|
| 5,308,134 A * | 5/1994 | Stanesic ......................... | 296/91 |
| 5,921,617 A | 7/1999 | Loewen et al. | |
| 6,644,720 B2 | 11/2003 | Long et al. | |
| 6,974,178 B2 * | 12/2005 | Ortega et al. ............. | 296/180.1 |
| 7,780,224 B2 * | 8/2010 | Roush ......................... | 296/180.4 |
| 8,186,745 B2 * | 5/2012 | Graham et al. ............ | 296/180.1 |
| 8,303,025 B2 * | 11/2012 | Senatro ..................... | 296/180.4 |
| 8,376,450 B1 * | 2/2013 | Long et al. ................. | 296/180.4 |
| 8,678,473 B2 * | 3/2014 | Dayton ...................... | 296/180.4 |
| 2008/0238139 A1 | 10/2008 | Cardolle | |

* cited by examiner

*Primary Examiner* — Dennis H Pedder
(74) *Attorney, Agent, or Firm* — Manelli Selter PLLC; Edward J. Stemberger

(57) ABSTRACT

A drag reduction plate is provided for trailers that are towed by vehicles along a roadway or highway, where the trailer typically has a box-like construction having a bottom, top, front, back, and sides, and at least one wheel set near the back end and below the bottom thereof. The drag reduction plate is a rigid or semi-rigid plate secured to and depending vertically downwardly from the bottom of the trailer and being disposed along a portion of the length of the trailer forwardly of the at least one wheel set. A drag reduction structure comprises a drag reduction plate and a pair of deflector plates also depending vertically downwardly from the bottom of a trailer; and extending outwardly and rearwardly from the rear end of the rigid or semi-rigid plate in a region which is forward of the at least one wheel set. The outer edges of the deflector plates are located at positions which are wider than the outer width of the wheel set.

22 Claims, 11 Drawing Sheets

DRAG REDUCTION PLATE AND STRUCTURE FOR TRAILERS

FIELD OF THE INVENTION

This invention relates to devices to reduce drag and therefore increase fuel efficiency with respect to trailers, especially those trailers which are intended to be towed by vehicles along a roadway or highway. In particular, the present invention provides for a drag reduction plate which may be secured beneath a trailer to the bottom thereof, and which will effect some reduction in drag as the truck is being towed, especially at high speeds. A further aspect of the present invention also provides for a drag reduction structure, the principal component of which is a drag reduction plate, but which also comprises a pair of deflector plates so as to further reduce drag on the trailer as it is being towed, particularly at high speeds, and therefore so as to enhance the fuel efficiency of the truck/trailer or tractor-trailer combination. Of further importance is the fact that the present invention essentially supplants the use of fairings which are typically attached along each side of a trailer, thereby reducing the capital cost of fitting or retrofitting a trailer so as to reduce drag thereon as it is being towed, particularly at high speed. It is also important to note that the drag reduction plate and drag reduction structure in keeping with the present invention, may be moved lengthwise along the trailer to accommodate the placement of the wheel set or wheel sets of the trailer, as they may change from time to time.

BACKGROUND OF THE INVENTION

In recent years, trucking companies have become more conscious of the costs of fuel consumed by their vehicles, particularly those trucks—which are very often referred to as tractors—whose purpose is to tow a trailer or trailers along the roadway, and especially at high speeds along a highway. While the manufacturers of such trucks are doing their best to improve efficiencies by making their truck designs more aerodynamic, and making their engines more fuel efficient, the fact remains that significant aerodynamic losses occur as a result of trailer design, especially at high speed. The current trailer designs create drag on the trailer due to wind resistance as the trailer moves. Even if the engine and the aerodynamic design of the trucks is improved, there still remains the problem of reducing the drag created by the trailer, so as to thereby increase the fuel efficiency of the towing truck.

Moreover, federal and state authorities in the United States and Canada are increasingly tightening the restrictions as they apply to the trucking industry, requiring more fuel efficiency so as to reduce carbon and greenhouse gas emissions from the trucks. Indeed, the California Air Resources Board has mandated that trailers must manifest lower drag coefficients so as to reduce carbon and greenhouse gas emissions in that state. Other states and provinces will undoubtedly follow suit, although the specific mandated reduction in drag may vary among those various authorities. Thus, even a reduction of drag of, say, 2%, may be acceptable in some states and provinces; whereas other states and provinces, such as California, may require a reduction of drag in the range of 2, 5, or 10%, or more.

One common approach to reduction of drag by trailers has been to fit or retrofit the trailers with fairings mounted along each side. Such fitment or retrofit may, however, be labour intensive as well as requiring considerable expenditure of capital money. Such expenses may be significant to any trucking company or a company which owns and rents trailers, even if the company's trailer inventory is only a few trailers, or possibly several thousand trailers.

Moreover, the fitment of fairings along both sides of a trailer may inhibit the opportunity of the trailer operator to move the wheel set or wheel sets on which the trailer moves. Depending on its intended use and load factors of the trailer, a wheel set may be moved more forwardly or backwardly along the bottom of the trailer for such purposes as balancing the load as well as to accomplish more efficient loading factors on the wheel sets.

The present inventors have unexpectedly discovered that rather than placing fairings along each side of a trailer, the fitment of a drag reduction plate along at least a portion of the length of the trailer forward of the trailers rear wheel set, where the drag reduction plate depends vertically downwardly from the bottom of the trailer, will reduce drag on the trailer. Of course, it is accepted that such installation to a trailer may not affect the same fuel efficiencies as will the fitment of fairings to a trailer, but does, in any event, result in higher fuel efficiencies which may be attained with lower capital cost, lower labour cost, and in faster time. Such an arrangement is most often acceptable to trucking company officials as well as to regulatory officials at the state or provincial levels.

As such, the present inventors have found that the provision of drag reduction plates, as well as other drag reduction structures, may be provided by what is essentially one or more plate-like structures, to the lower surfaces of a trailer. The plate, or plates, may be made of a rigid or semi-rigid material such as steel or aluminum, but more preferably is made of a rigid or semi-rigid material such as a reinforced plastic or fiberglass or composite structure having lower cost and lower weight than a similar steel structure.

DESCRIPTION OF THE PRIOR ART

Several patents teach the use of underbody trailer fairings, which have some adjustability as to their fitment to a trailer. They include U.S. Pat. Nos. 5,921,617 and 6,644,720.

The '617 patent issued Jul. 13, 1999 to Loewen et al, and teaches a fairing assembly which has longitudinally extending forward and rearward sections. The intent is for the rearward section to be moved longitudinally so as to adjustably locate its rearward edge in a selected position forward of the wheel assembly of the trailer. To accommodate such adjustment, the rearward section is coupled to and longitudinally movable with the support frame for the wheel assembly, thereby maintaining its longitudinal adjustment relative to the trailer and to the wheel assembly. A hinge mechanism permits each section of the fairing to be pivotally displaced between lowered and raised positions. The patent states that improved fuel economy may be achieved while the trailer is towed at highway speeds over long distances with proper mounting of the fairings. The lowered and raised positions of the fairings are intended to accommodate situations where the trailer may be moved over ramps or uneven terrain.

The '720 patent issued Nov. 11, 2003 to Long et al, and teaches an adjustable trailer underbody fairing structure, where the fairing includes an adjustable fairing panel which extends and collapses as the rear wheel assembly of the trailer is moved, so as to present a planar fairing surface at all times. Once again, the patent speaks of improving long distance fuel economy for the haulage of trailers by the fitment of fairings mounted at each lower longitudinal edge of the trailer. It is important, according to the patent, that the fairing can be adjusted quickly and easily to accommodate repositioning of the wheel assembly of the trailer, so that the length of the fairing shall be optimized in each situation so as to reach maximum fuel economy. Accordingly, the fairing structure includes a foldable panel which has a plurality of vertically oriented slats that are slidably mounted on a telescoping frame, each of the slats having a fabric mounted thereon. The intention is that the adjustable fairing panel shall fold and unfold in the manner of an accordion, so as to permit adjustment of the fairing. However, it is important, as well, for the fabric to be put into tension in order to maintain reduced fuel efficiency.

United States Patent Application Publication 2008/0238139, published Oct. 2, 2008, relates to an application filed by Cardolle. That application proposes a somewhat different approach so as to reduce fuel consumption, particularly for motorized vehicles when they are pulling trailers, many of which lack in aerodynamic design. The intent is to provide a structure which gives clearance between the axles of the trailer, and which allows access to the underbody of the trailer. This involves the provision of a transverse fairing which can be designed to facilitate the forward movement of the trailer by placing the fairing in front of a rear wheel assembly so as to divert airflow which is engulfed in the underside of the trailer towards the sides of the trailer. Accordingly, a fairing shell is placed in front of the wheel assembly and is shaped so as to divert the air that flows away from the wheel assembly. The shell covers substantially the frontal area of the wheel assembly, and may have side extensions which extend along the sides of the trailer so as to at least partially cover the sides of the wheel set.

SUMMARY OF THE INVENTION

The advantages set out hereinabove, as well as other objects and goals inherent thereto, are at least partially or fully provided by the drag reduction plate, and drag reduction structure, of the present invention, as set out herein below.

In accordance with one aspect of the present invention, therefore, there is provided a drag reduction plate for trailers that are towed by vehicles along a roadway or highway, where the trailer typically has a box-like construction having a bottom, top, front, back, and sides, and at least one wheel set near the back end thereof and below the bottom of the trailer structure. The drag reduction plate comprises a rigid or semi-rigid plate secured to and depending vertically downwardly from the bottom of the trailer and being disposed along a portion of the length of the trailer and forwardly of the at least one wheel set.

Typically, the length of the rigid or semi-rigid plate is from 10% to 90%, and more preferably, between 25% to 80%, and most preferably, between 40 to 65%, of the length of the trailer forwardly of the at least one wheel set to the landing gear centre line, of the trailer.

Moreover, typically the height of the rigid or semi-rigid plate is from 15% to 95%, more preferably 50 to 95%, and still more preferably, from 70 to 95%, of the vertical clearance height from the ground to the bottom of the trailer.

In general, preferably at least a portion of the leading edge of the rigid or semi-rigid plate slopes downwardly and rearwardly.

Preferably, the drag reduction plate includes a flexible material secured along the length of the rigid or semi-rigid plate at the bottom edge thereof, and thereby comprises at least a portion of the height of the rigid or semi-rigid plate in the range of 10% to 25% of the height of the rigid or semi-rigid plate thereof.

In general, the rigid or semi-rigid plate is secured essentially along the longitudinal axis of the trailer; however, it is also possible that the rigid or semi-rigid plate may be secured longitudinally along the bottom of the trailer, but offset from the longitudinal axis of the trailer to the right or left thereof by up to 25% of the width of the trailer.

The present invention also provides an enhanced drag reduction structure for trailers that are towed by vehicles along a roadway or highway, where the trailer typically has a box-like construction having a bottom, top, front, back, and sides, and at least one wheel set near the back end thereof and below the bottom of the trailer structure.

In this case, the enhanced drag reduction structure comprises a drag reduction plate as described above, and further comprises a pair of deflector plates secured to and depending substantially vertically downwardly from the bottom of the trailer. The deflector plates can be attached to the rigid or semi-rigid plate at each side thereof and at the rear end thereof, but more preferably, the deflector plates merely abut, meet, or overlap with, the rear end of the drag reduction plate. A small gap can be provided (e.g. less than about 20 cm) between the drag reduction plate and the deflector plates, but preferably, the rear end of the drag reduction plate is within 5 cm of the deflector plates. More preferably, the ends of the deflector plates at least partially overlap with the drag reduction plate.

Each of the pair of deflector plates extends outwardly and rearwardly from the rear end of the rigid or semi-rigid plate in a region which is forward of the at least one wheel set. Moreover the outer edges of each of the deflector plates are preferably located at positions which are at least as wide, or wider, than the outer width of the at least one wheel set.

As before, the height of the drag reduction structure is typically from 15% to 95%, more preferably 50 to 95%, and still more preferably, from 70 to 95%, of the vertical clearance height from the ground to the bottom of the trailer; but the height of the deflector plates is preferably from 60% to 110% of the height of the rigid or semi-rigid drag reduction plate. Preferably, the deflector plates are between 95 and 105% of the height of the drag reduction plate, and most preferably, are of the same height of the drag reduction plate.

Also, in the manner described above, each of the deflector plates may further comprise flexible material secured along the length of the rigid or semi-rigid plate at the bottom edge thereof, and comprising a portion of the height of the rigid or semi-rigid plate in the range of 10% to 25% thereof.

Typically, at least the outer portion of each of the pair of deflector plates is curved rearwardly in the region of the respective outer edges thereof, and the inner portion of each of the pair of deflector plates is curved outwardly, in the region of the drag reduction plate. The radius of the curves of the deflector plates can vary depending on the application, but typically the curve radii are selected from values between 35 and 130 cm.

The deflector plates, in general, can be essentially perpendicular to the axis line of the drag reduction plate, but preferably, the deflector plates extend outwardly, and rearwardly at an angle of between 30 and 80°, and more preferably, at an angle of from 45 to 60°, from the longitudinal axis of the trailer.

Moreover, the sideways projection of the pair of deflector plates, as seen from the side of the trailer, is from 5% to 40% of the length of the trailer forwardly of the at least one wheel set of the trailer, to the landing gear centre line.

It is, of course, intended that the drag reduction plate and the drag reduction structure as they are taught and claimed herein may be movable forwardly and rearwardly of the trailer along its longitudinal axis.

And, of course, it will be understood that any trailer to which a drag reduction plate or drag reduction structure as taught and claimed herein may have at least two wheel sets, at the rear of the trailer, and the placement of the rigid or semi-rigid plate or of the drag reduction structure, is forward of the forwardmost wheel set.

The material of the rigid or semi-rigid drag reduction plate, and the material of the drag reduction structure, may be chosen from the group consisting of steel, aluminum, alloys of steel, alloys of aluminum, reinforced plastics material, thermoset composites, thermoplastic materials (e.g. TPO, PP), and the like. Also, combinations thereof and therebetween, such as sheets of steel sandwiching a plastic core, or combinations of different types of composite materials, and the like, might be used. However, any suitable material can be used, and the use of other materials is not excluded from the present invention.

Also, it should be noted, that in the present application, the term "drag reduction plate" refers to a longitudinal plate fitted to the bottom surface of a truck trailer. However, the skilled artisan will be aware that the drag reduction plate can be used in a wide variety of applications. Accordingly, while the present application is described with particular reference to a truck trailer application, the skilled artisan would be aware that the present application is equally applicable in other non-truck trailer applications, such as in the application of a similar drag reduction plate fitted to the bottom of railway train cars, flat bed trailers, or the like.

BRIEF DESCRIPTION OF THE DRAWING

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example only, in association with the accompanying drawings in which.

DETAILED DESCRIPTION OF THE PREFERRED EMBODIMENTS

Figure 1:
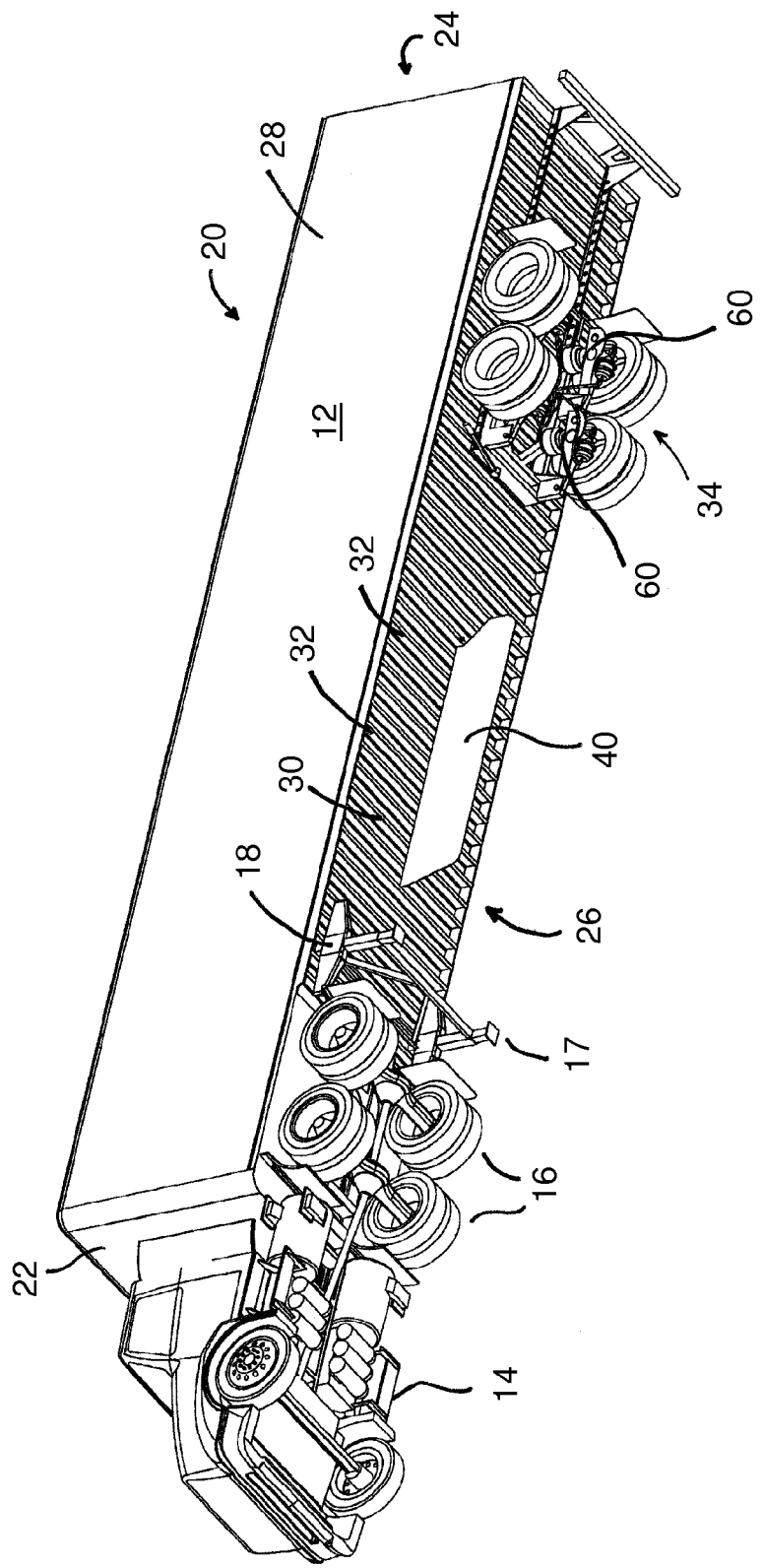
FIGS. 1 and 1A are perspective views of the underside of a typical trailer which is attached to any suitable towing vehicle, and showing a drag reduction plate, and an enhanced drag reduction plate with deflector plates.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention. Also, unless otherwise specifically noted, all of the features described herein may be combined with any of the above aspects, in any combination.

Figure 1A:
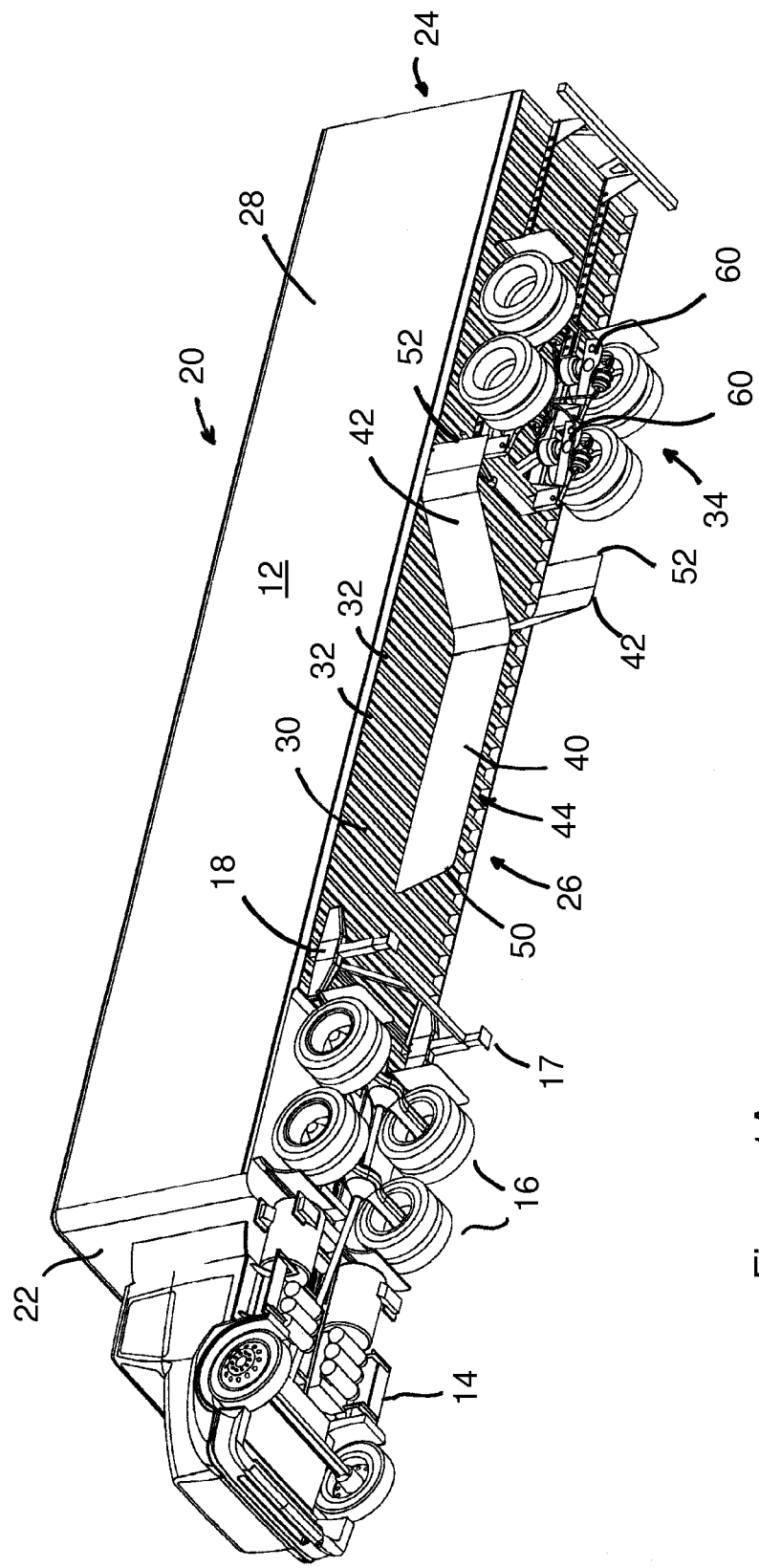
Figure 2:
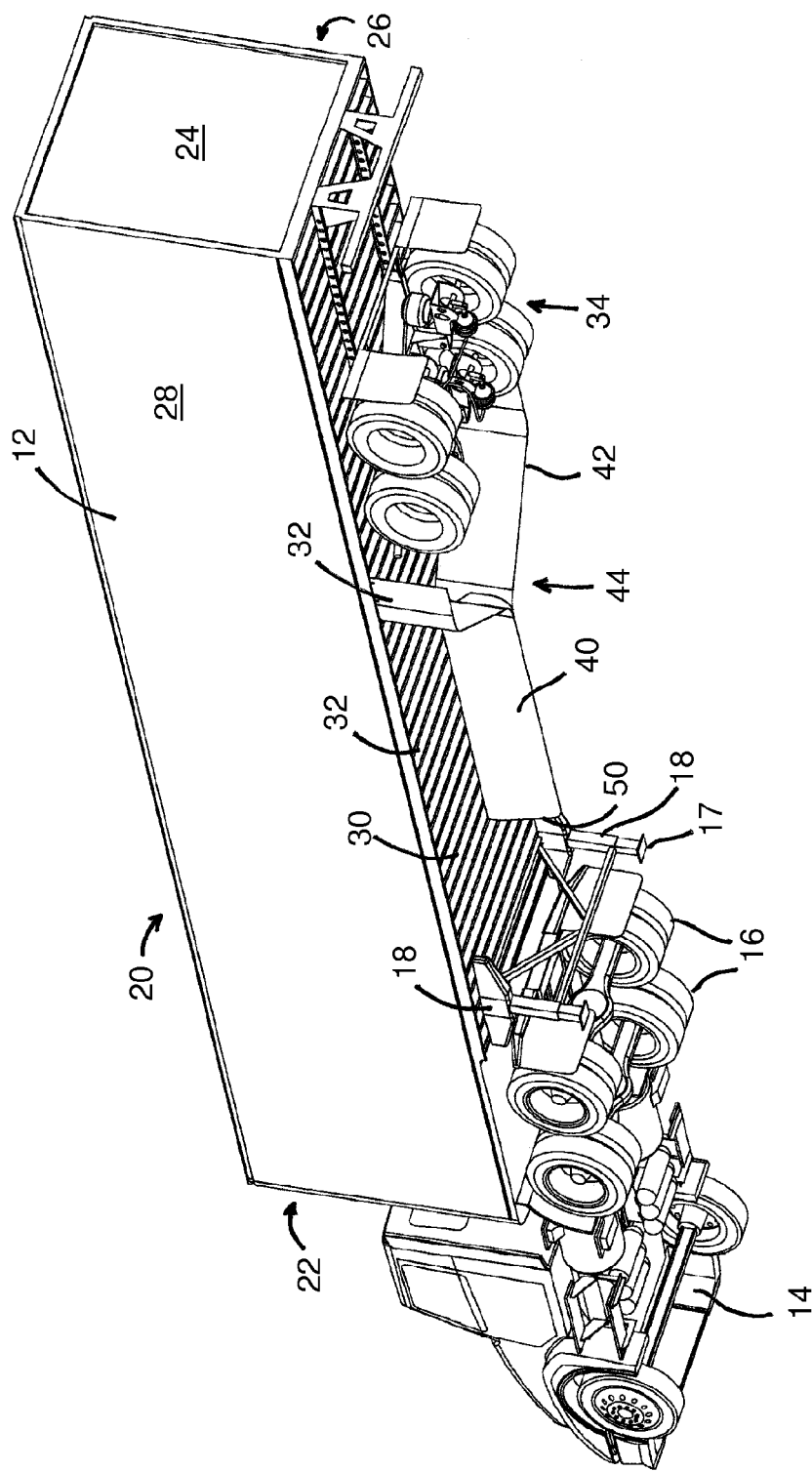
FIG. 2 is a different perspective view of a similar embodiment as shown in FIG. 1A.

Referring to the drawings, and particularly to FIGS. 1, 1A and FIG. 2, there is shown in a box-like trailer 12 which is connected to a truck 14 having drive wheels 16. It will be understood that the trailer includes landing gear 17, and the landing gear centre line, is in the region designated at 18. The specific structure of the trailer 12 is immaterial to the present invention; it being understood, however, that the box-like structure of the trailer 12 shown in the figures, comprises, inter alia, a top 20, a front 22, a back 24, two sides 26 and 28, and a bottom 30. For ease of illustration, and because FIGS. 1, 1A and 2 show a standard or widely used construction, they illustrate that the bottom 30 may comprise a plurality of I-beams 32. The I-beams 32 fulfill at least two functions, which are to provide strength to the bottom structure of the trailer 12, and so as to provide attachment regions which will also permit forward or rearward movement of the wheel sets of the trailer, such as that which is shown at 34. As noted above, moving a wheel set forwardly or rearwardly of the trailer is sometimes effective for purposes of load balancing, and so on.

It is also noted above that the present invention comprises two fundamental embodiments. The first is the provision of a drag reduction plate for trailers, such as that which is shown at 40 in FIG. 1; and the second is the provision of an enhanced drag reduction structure for trailers which comprises not only a drag reduction plate 40, but also a pair of deflector plates 42, as shown in FIGS. 1A and 2. That combination is identified by reference numeral 44.

It will therefore be understood that the drag reduction plate 40 may be employed by itself, or in association with other structural modifications that have been made to a trailer 12, including those shown in FIGS. 1A and 2.

In any event, the drag reduction plate 40 comprises a rigid or semi-rigid plate which is secured to and depends vertically downwardly from the bottom 30 of a trailer 12. The drag reduction plate 40 is disposed along a portion of the length of the trailer and forwardly of the at least one wheel set 34. In the event that there are a plurality of wheel sets 34, the drag reduction plate 40 is secured to the bottom 30 of the trailer 12 in a position which is forward of the forwardmost wheel set.

Figure 3:
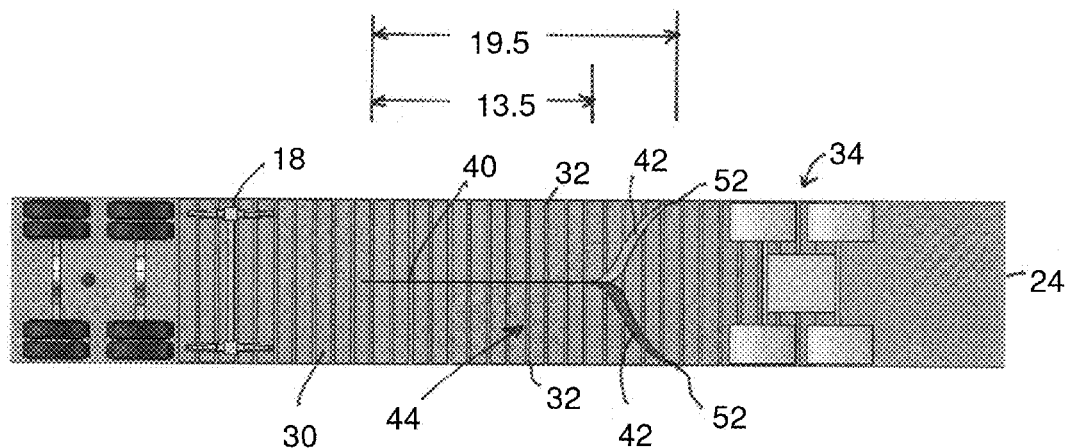
FIGS. 3 and 3A are plan views from underneath of a trailer having a drag reduction structure in keeping with FIG. 1A.

The length of the drag reduction plate 40 may be within the range of from 25% to 80% of the length of the trailer forwardly of the at least one wheel set 34 to the landing gear centre line 18. For purposes of example only, and not in any way so as to limit the ambit of the present discussion and teachings, and the appended claims, a typical dimension is shown in FIG. 3, where it is understood that for a 53 foot trailer, the length of the drag reduction plate 40 may be 13.5 feet; and the length of the overall drag reduction structure 44 may be 19.5 feet. Thus, it can be inferred that the sideways projected length of the deflector plates 42 and their attachment to the drag reduction plate 40 is 6 feet, in this example.

Before proceeding with further discussion of the drag reduction plate, it must be noted that the overall configuration of the drag reduction plate 40 is such that it is longer than it is high (with reference to the figures), and its thickness is very thin by comparison. The materials from which the drag reduction plate 40 may be constructed include sheet metals such as steel or aluminum, which in the latter case may need to be braced; or the drag reduction plate 40 may be constructed from a suitable rigid or semi-rigid plastics material such as composite reinforced fiberglass. If the latter, then the weight of the drag reduction plate 40 may be significantly reduced, leading to a lesser load on the truck 14, and possibly also to lower costs. In any event, the drag reduction plate 40 is preferably attached to the bottom 30 in such a manner that it will retain its rigid or semi-rigid nature. Preferably, the drag reduction plate is somewhat resilient so that it will return to its original position if deflected as a result of coming in contact with any obstacles.

The manner of the attachment of the drag reduction plate 40 to the bottom 30 of trailer 12 is outside the scope of the present invention, and in any event is typically a matter which will be known to those skilled in the truck or trailer structural arts.

It should also be noted that empirical data indicate that the mere presence of a drag reduction plate 40 as contemplated by the present invention attached to the bottom 30 of a trailer 12 clearly increases the fuel efficiency of a truck 14.

The height of the drag reduction plate 40 must be such that it does not interfere with the road or terrain over which trailer 12 is towed. However, it should be noted that the height of the rigid or semi-rigid drag reduction plate 40 may be in the range of 15% to 95% of the vertical clearance height from the ground to the bottom 30 of the trailer 12.

However, in the event that there is interference between the bottom edge of the rigid or semi-rigid drag reduction plate 40 and the ground or terrain over which it is being towed, it is usual to provide a flexible material 46, such as EPDM rubber (e.g. ethylene propylene diene monomer (M-class) rubber), which is secured along the length of the drag reduction plate 40 at the bottom edge thereof. This is shown particularly in FIG. 4 (but omitted, for clarity, from the remaining figures). The height of the flexible material comprises a portion of the overall height of the drag reduction plate 40, and, when used, is typically in the range of 10% to 25% of the overall height of the drag reduction plate 40.

It will also be seen in each of FIGS. 1, 1A, 2, 4 that the leading edge 50 of the rigid or semi-rigid drag reduction plate 40 is such that preferably at least a portion thereof slopes downwardly and rearwardly. The angle of the slope can vary but preferably is in the range of from 20 to 80°, but more preferably, in the range of from 30 to 60'.

In general, a single rigid or semi-rigid drag reduction plate 40 is secured to the bottom 30 of the trailer 12 in a position which is essentially along the longitudinal axis of a trailer 12; that is, along the longitudinal midline of the trailer. However, in some circumstances it is possible that the drag reduction plate 40 may be secured to the bottom 30 of a trailer 12 in longitudinal manner but which is offset from the longitudinal axis of the trailer to the right or left thereof by up to 25% of the width of the trailer, in either direction. While an angled arrangement is possible, this is not preferred since this might adversely affect the straight-line travel of the trailer. As such, preferably, the drag reduction plate is preferably essentially parallel to the longitudinal axis of the trailer.

The present discussion now turns to the provision of an enhanced drag reduction structure for trailers, which of course are otherwise as described above. As noted, the drag reduction structure 44 comprises a drag reduction plate 40 together with a pair of deflector plates 42 which are secured to and depend downwardly from the bottom 30 of a trailer 12, and which abuts (or can be attached) to the drag reduction plate 40 at each side thereof, at the rear end thereof. This is evident from any of FIGS. 1A to 6, and it will also be clear that preferably, no significant gap is provided between drag reduction plate 40, and deflector plates 42.

Figure 7:
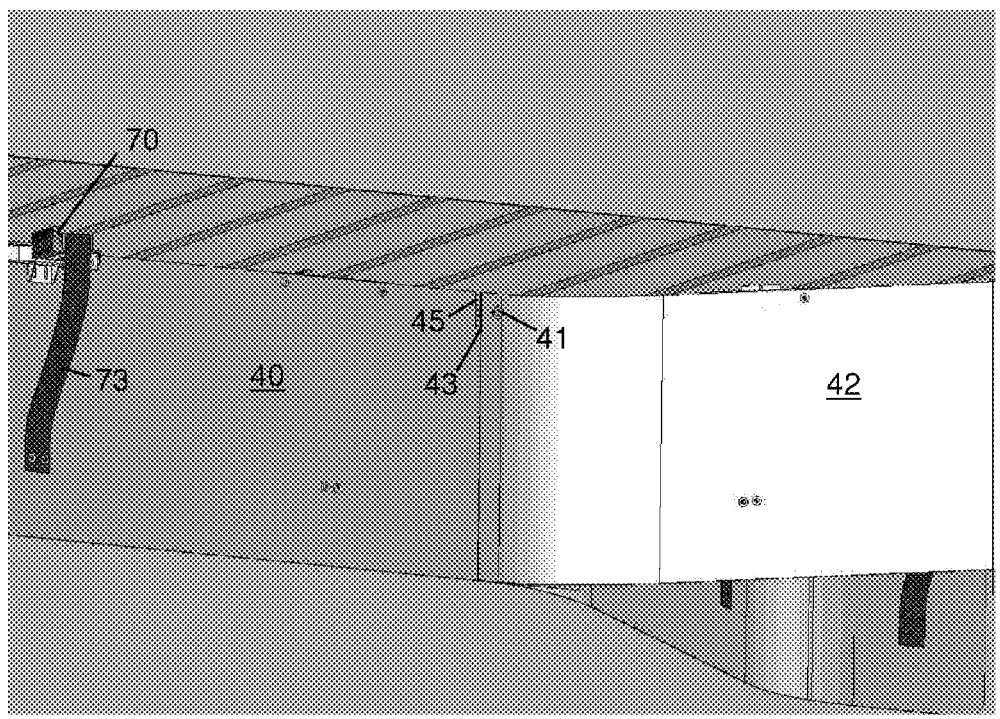
FIG. 7 is a view of the overlap arrangement of the deflector plates and the drag reduction plate.

In fact, in the preferred embodiment, the drag reduction plate 40 overlaps with the deflector plates 42, as seen in FIG. 7. In FIG. 7, the ends of the deflector plates 42 are bolted together using bolt 41. However, a gap 43 is left between the ends of deflector plates 40. The rearward end of drag reduction plate 40 is fitted into gap 43, and a notch 45 in drag reduction plate 40 allows drag reduction plate 40 to be fitted into gap 43, without being bolted to deflector plates 42. As such, during normal flexing of the trailer in use, the deflector plates 42 can move relative to the drag reduction plate 40, without any damage.

Each of the pair of deflector plates 42 extends outwardly and rearwardly from the rear end of the drag reduction plate 40, which is also evident from any of FIGS. 1A to 6. Moreover, the outer edges 52 of the pair of deflector plates 42 are preferably located at positions such that the distance between them is equal to, or wider than the outer width of the wheel set 34.

In general, the height of each of the pair of deflector plates 42 is the same as the height of the drag reduction plate 40. However, it is also possible that the height of each of the pair of deflector plates 42 may differ from that of the drag reduction plate 40, and may range from 60% to 110% of the height of the drag reduction plate 40.

Figure 4:
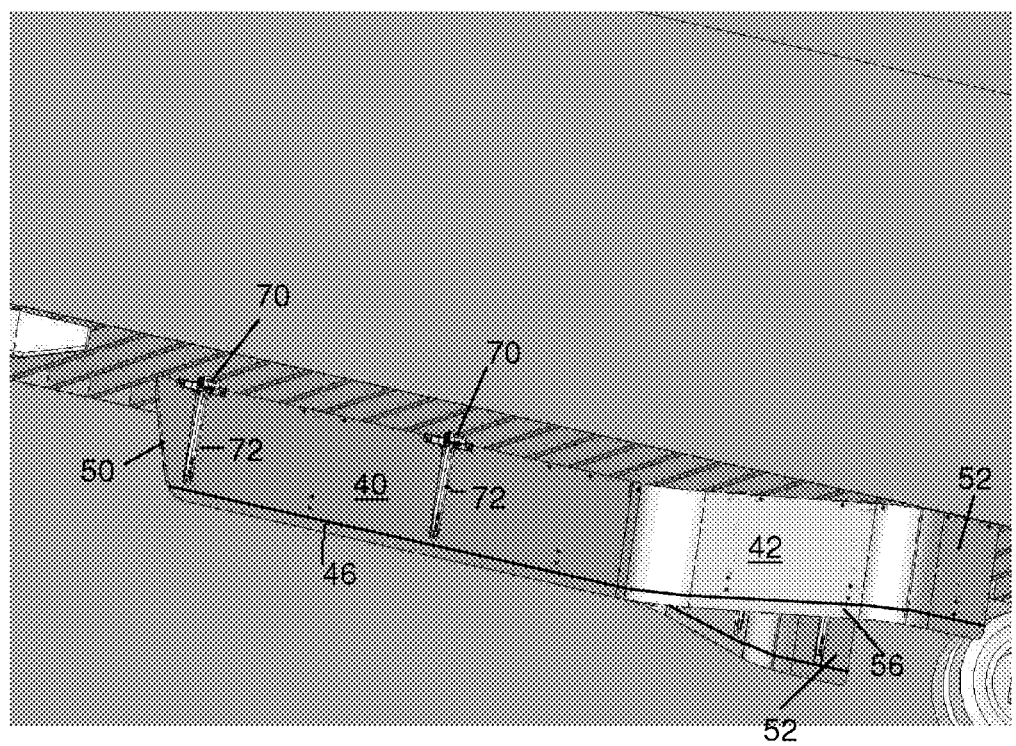
FIGS. 4, 5, 6 show the installation of an enhanced drag reduction structure to the bottom of a trailer from different viewing angles.
Figure 5:
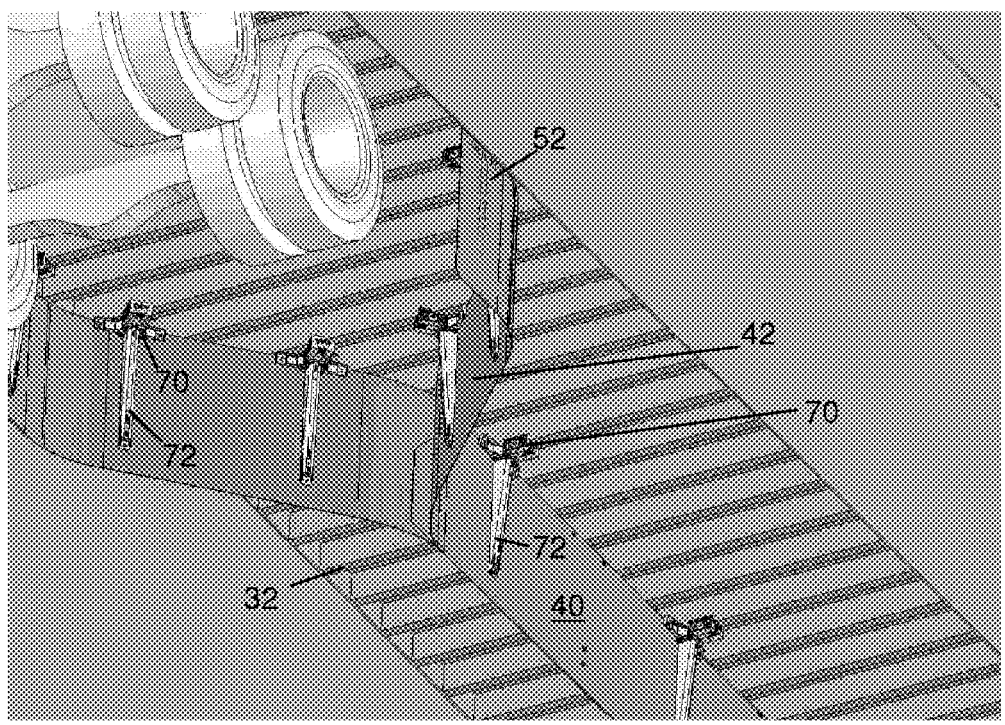

Also, as can be seen in FIG. 4, the bottom edge of the pair of deflector plates 42 is also provided with a strip of flexible, scuff resistant material 56, as previously described, whose height may comprise from 10% to 25% of the overall height of the deflector plates 42. The rubber may also be used at the rear end of the drag reduction plate 40, where it meets deflector plates 42 (not shown).

While it is not necessary, it is not unusual for the configuration of the deflector plates 42 to be curved rearwardly, at least in the regions of the respective outer edges 52 thereof, and in the area where they meet the drag reduction plate. In the example shown in FIG. 3A, which is an enlarged version of design similar to that shown in FIG. 3, the deflector plates 42 have an inside radius of 37.5 cm (15 inches), and an outside radius of 37.5 cm (15 inches). Also, the deflector plates 42 extend away from the trailer's longitudinal axis at an angle of about 55°. Clearly, other radii, and angles can be used, as previously noted.

Preferably the same angles and radii are used on each deflector plate, so that the construction of the drag reduction structure is preferably symmetrical.

Figure 3A:
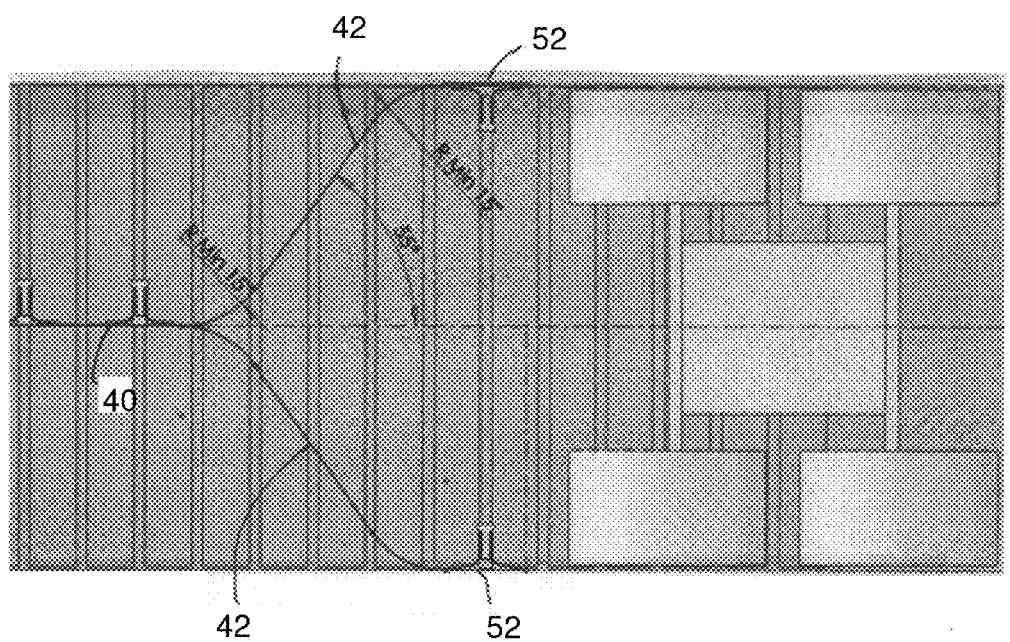

Also, while the deflector plates 42 can be provided so as to be generally perpendicular to the bottom of trailer 30, as seen in FIG. 3A, they can also have a curved or slanted profile so that they will curve or angle rearwardly as they move further away from the bottom of trailer 30, as seen in FIG. 3. When curved or angled, preferably, the curve or angle is rearwardly at an angle of between 1 and 20° from perpendicular, and more preferably, is between 5 and 10°. A most preferred angle or curve is about 7°.

When viewed from the side of the trailer, the sideways projection of the pair of deflector plates 42 is preferably from 5% to 40% of the length of the trailer forwardly of the wheel set 34 to the landing gear centre line 18.

Of course, it will be understood from the above discussion that if the wheel set 34 is moved forwardly or rearwardly of the trailer, then the drag reduction plate 40 or the drag reduction structure 44 may also be moved forwardly or rearwardly by a like amount. This can be achieved by either removing and reinstalling the drag reduction plate and/or deflection plates, or by having the deflection plates and/or drag reduction plate attached to the wheel set support structure.

It will also be understood, of course, that any trailer 12 may have more than one wheel set 34. Indeed, trailers having three or four axles 60 are very common on the highways of the United States and Canada; and trailers having even more axles than four are also seen on the highways of the United States and Canada.

Empirical data have shown that the presence of a drag reduction plate 40, or a drag reduction structure 44 as contemplated by the present invention attached to the bottom 30 of the trailer 12 will decrease drag, and therefore may increase fuel efficiency of the truck 14 by up to 2, 4, or 5%, or more.

Referring again to FIGS. 4 and 5, a method of mounting and securing the drag reduction structure 44 in place is shown. This particular method employs monolithic clamps 70 which are quite similar to those that are taught in Applicant's pending U.S. application Ser. No. 61/444,514, filed Feb. 18, 2011, and commercially available from Laydon Composites Ltd. The monolithic clamps 70 are preferably used also in association with resilient braces 72 in the manner shown in the figures. The braces 72 can be used on one side of the drag reduction plate 40, or on the deflector plates 42, or they can be employed on each side of the drag reduction plate 40 or deflector plates 42.

Figure 6:
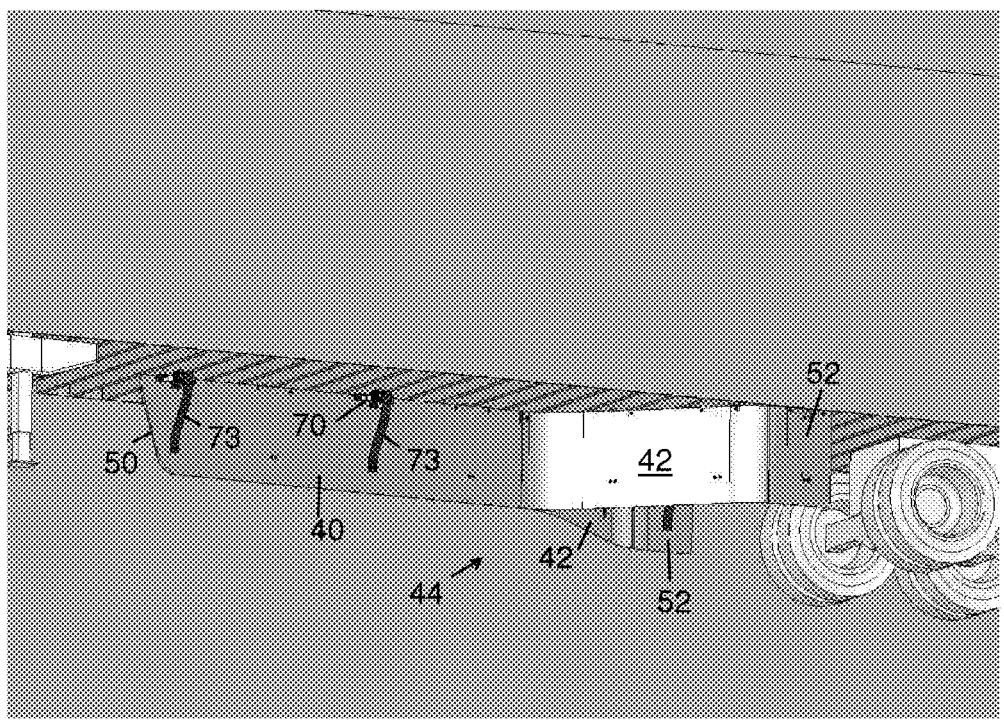

In FIGS. 6 and 7, an alternative system can be used which includes a flexible, resilient strap 73, which is affixed to clamp 70, and the drag reduction plate 40 or deflector plates 42. Other systems can also be employed.

Figure 8:
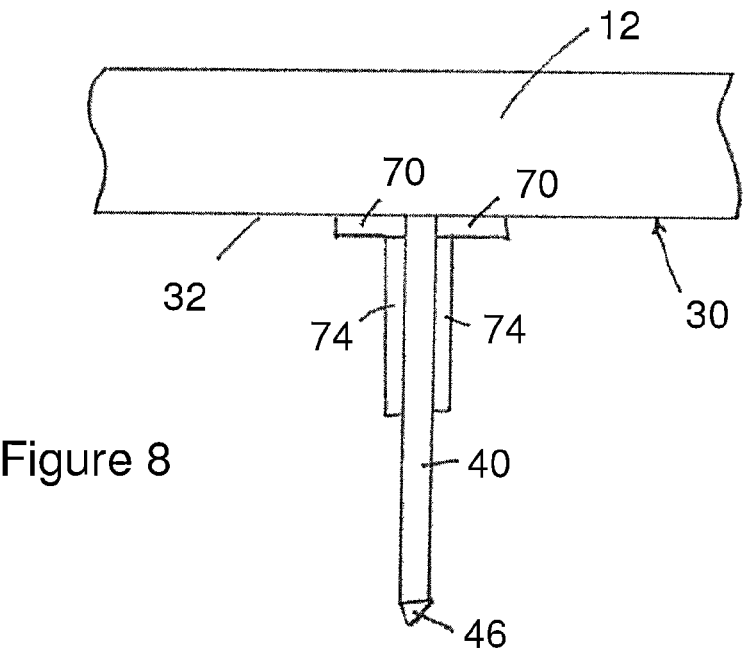
FIGS. 8, 9, 10, and 11 are all figures showing different approaches for the attachment of at least a drag reduction plate in keeping with the present invention to the bottom of the trailer.
Figure 9:
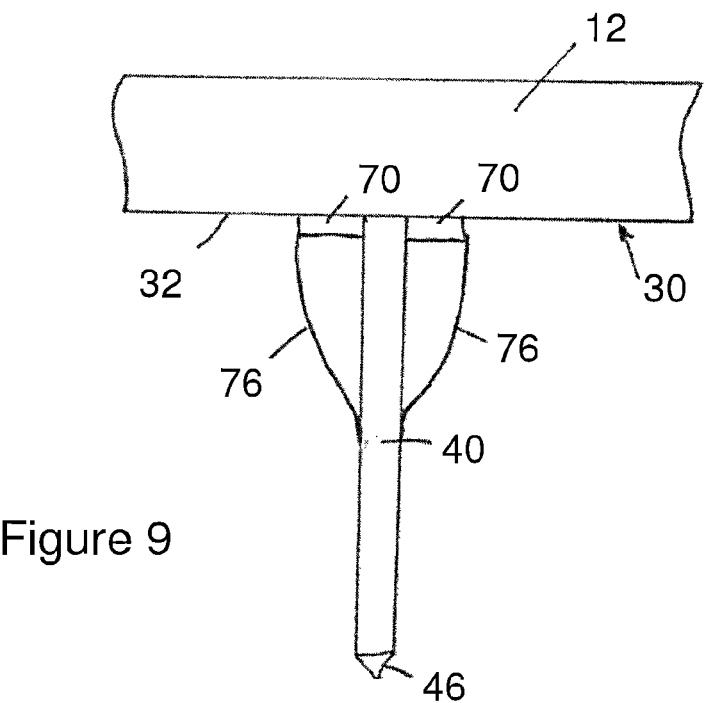

For example, in FIG. 8, an end view of drag reduction plate 40 is shown, wherein shortened flexible braces 74 are provided, which are bolted to monolithic clamp 70. In FIG. 9, shortened straps 76 are used, wherein shortened straps 76 only extend roughly half the distance of drag reduction plate 40.

Figure 10:
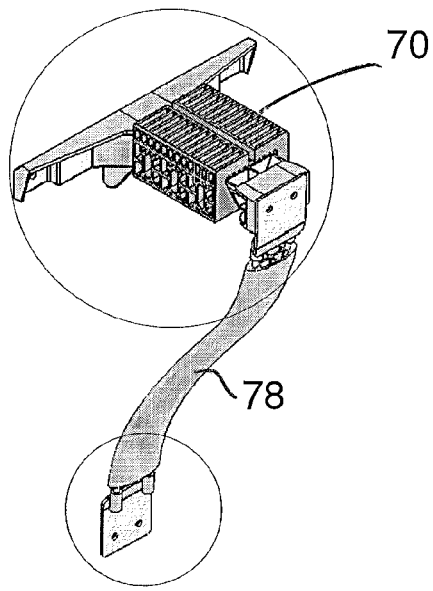
Figure 11:
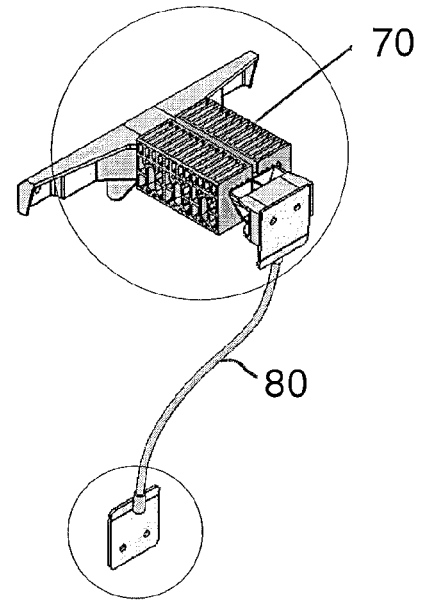

In FIG. 10, a flattened, aerodynamic tube structure 78 is shown, and in FIG. 11, a rod structure 80 is shown. Both are attached to monolithic clamps 70.

Clearly, a variety of mounting systems might be used.

However, as previously noted, the precise manner of mounting the drag reduction plate 40 and/or the drag reduction structure 44 are beyond the scope of the present invention, and in any event may be in keeping with well known mounting and clamping means known to those skilled in the art.

Figure 12:
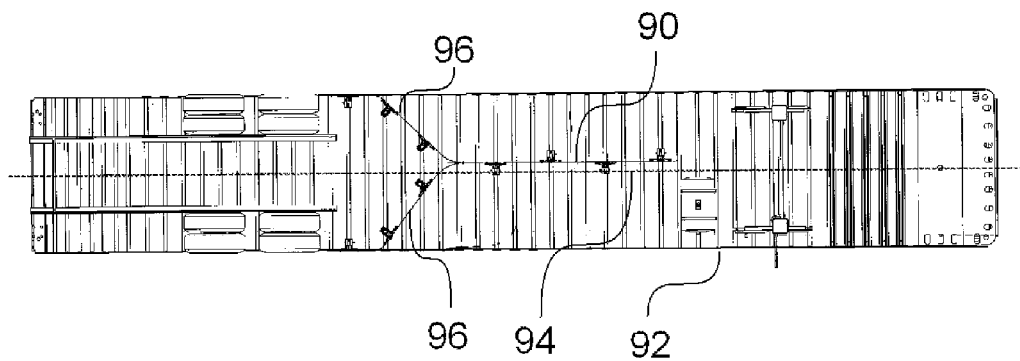
FIG. 12 is a view similar to FIG. 3 showing an offset drag reduction plate.

In FIG. 12, in a further embodiment, deflector plates 96 and a rigid or semi-rigid plate, in the form of drag reduction plate 90, are shown on the bottom of trailer 92. A central longitudinal axis line 94 of trailer 92 is also shown, and it can be seen that drag reduction plate 90 is offset from longitudinal axis 94.

There has been described a drag reduction plate may be employed on a per se basis to reduce the drag on a towed trailer, particularly one which is being towed at high speed along a highway. There has also been described an enhanced drag reduction structure which employs not only a drag reduction plate but a pair of deflector plates; and employment of a drag reduction structure as taught by the present invention may result in significant reduction of drag on a towed trailer, and therefore a significant increase in fuel efficiency of a truck which is towing a trailer that is so equipped.

Other modifications and alterations may be used in the design and setup of the present invention, without departing from the spirit and scope of the accompanying claims.

Thus, it is apparent that there has been provided, in accordance with the present invention, a drag reduction plate, and drag reduction structure, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practiced in the absence of any element which is not specifically disclosed herein.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

The invention claimed is:

1. A drag reduction structure for trailers that are towed by vehicles along a roadway or highway, where the trailer has a box-like construction having a bottom, top, front, back, and sides, and at least one wheel set near the back end thereof and below the bottom of the trailer structure, wherein said drag reduction structure comprises: a drag reduction plate comprising a rigid or semi-rigid plate secured to and depending vertically downwardly from the bottom of the trailer and being disposed along a portion of the length of the trailer and forwardly of said at least one wheel set; and a pair of deflector plates secured to and depending substantially vertically downwardly from the bottom of the trailer and meeting, abutting, and/or overlapping with respect to said rigid or semi-rigid plate at each side thereof and at the rear end thereof, but wherein a forward portion of said deflector plates can move relative to a rearward portion of said rigid or semi-rigid plate during normal flexing of said trailer, and wherein each of said pair of deflector plates extends outwardly and rearwardly from the rear end of said rigid or semi-rigid plate in a region which is forward of the at least one wheel set, and wherein at least the outer portion of each of the pair of deflector plates is curved rearwardly in the region of the respective outer edges thereof, and the inner portion of each of the pair of deflector plates is curved outwardly, in the region of said rigid or semi-rigid plate.

2. The drag reduction structure of claim 1, wherein the length of said rigid or semi-rigid plate is from 25% to 80% of the length of the trailer forwardly of said at least one wheel set to the landing gear centre line of the trailer.

3. The drag reduction structure of claim 1, wherein the height of said rigid or semi-rigid plate is from 15% to 95% of the vertical clearance height from the ground to the bottom of the trailer.

4. The drag reduction structure of claim 1, wherein at least a portion of the leading edge of said rigid or semi-rigid plate slopes downwardly and rearwardly.

5. The drag reduction structure of claim 1, further comprising a flexible material secured along the length of said rigid or semi-rigid plate at the bottom edge thereof, and comprising a portion of the height of said rigid or semi-rigid plate in the range of 10% to 25% thereof.

6. The drag reduction structure of claim 1, wherein said rigid or semi-rigid plate is secured along the longitudinal axis of the trailer.

7. The drag reduction structure of claim 1, wherein said rigid or semi-rigid plate is secured longitudinally along the bottom of the trailer, but offset from the longitudinal axis of the trailer to the right or left thereof by up to 25% of the width of the trailer.

8. The drag reduction structure of claim 1 wherein the outer edges of each of said deflector plates are located at positions which are equal to, or wider between them, than the outer width of said at least one wheel set.

9. The drag reduction structure of claim 1, wherein the height of each of said pair of deflector plates is the same as the height of said drag reduction plate.

10. The drag reduction structure of claim 1, wherein the height of each of said pair of deflector plates is from 60% to 110% of the height of said drag reduction plate.

11. The drag reduction structure of claim 1, wherein said deflector plates and/or said rigid or semi-rigid plate further comprises a flexible material secured along the length of said deflector plates or said semi-rigid plate at the bottom edge thereof, and comprising a portion of the height of said deflector plate or said rigid or semi-rigid plate in the range of 10% to 25% thereof.

12. The drag reduction structure of claim 1, wherein the sideways projection of said pair of deflector plates, as seen from the side of the trailer, is from 5% to 40% of the length of the trailer forwardly of said at least one wheel set to the landing gear centre line of the trailer.

13. The drag reduction structure of claim 1, wherein said at least one wheel set is movable forwardly and rearwardly of the trailer along the longitudinal axis thereof; and
  wherein said rigid or semi-rigid drag reduction plate is also movable forwardly and rearwardly of the trailer.

14. The drag reduction structure of claim 1, wherein said at least one wheel set is movable forwardly and rearwardly of the trailer along the longitudinal axis thereof; and
  wherein said drag reduction structure is also movable forwardly and rearwardly of the trailer.

15. The drag reduction structure of claim 1, wherein there are at least two wheel sets, and the placement of said rigid or semi-rigid plate is forward of the forwardmost wheel set.

16. The drag reduction structure of claim 1, wherein there are at least two wheel sets, and the placement of said drag reduction structure is forward of the forwardmost wheel set.

17. The drag reduction structure of claim 1, wherein the material of said rigid or semi-rigid plate is chosen from the group consisting of steel, aluminum, alloys of steel, alloys of aluminum, reinforced plastics material, thermoset composites, and thermoplastic materials, and combinations thereof.

18. The drag reduction structure of claim 1, wherein the material of said drag reduction structure is chosen from the group consisting of steel, aluminum, alloys of steel, alloys of aluminum, reinforced plastics material, thermoset composites, and thermoplastic materials, and combinations thereof.

19. The drag reduction structure of claim 1 wherein the radius of the curves of the deflector plates are selected from values between 35 and 130 cm, and wherein
  said deflector plates extend outwardly, and rearwardly at an angle of between 30 and 80°, from the longitudinal axis of the trailer.

20. The drag reduction structure of claim 19 wherein said deflector plates, are generally perpendicular to the bottom of said trailer.

21. The drag reduction structure of claim 19 wherein said deflector plates have a curved or slanted profile so that they curve or angle rearwardly as they move further away from the bottom of trailer.

22. The drag reduction structure of claim 21 wherein said deflector plates curve or angle rearwardly at an angle of between 1 and 20° from perpendicular to the bottom of said trailer.

* * * * *